United States Patent [19]

Stuart et al.

[11] 3,988,586

[45] Oct. 26, 1976

[54] COMBINATION NEUTRON-GAMMA RAY DETECTOR

[75] Inventors: Travis P. Stuart; Wilbur J. Tipton, both of Las Vegas, Nev.

[73] Assignee: The United States of America as represented by the United States Energy Research and Development Administration, Washington, D.C.

[22] Filed: June 24, 1975

[21] Appl. No.: 589,807

[52] U.S. Cl. .............................. 250/367; 250/369; 250/390
[51] Int. Cl.² ........................................... G01T 1/20
[58] Field of Search ........... 250/390, 391, 392, 362, 250/367, 369

[56] References Cited
UNITED STATES PATENTS

| | | |
|---|---|---|
| 2,769,916 | 11/1956 | Tittle .............................. 250/391 |
| 3,786,256 | 1/1974 | Untermyer ......................... 250/391 |
| 3,911,283 | 10/1975 | Williams ........................ 250/390 X |

*Primary Examiner*—Davis L. Willis
*Attorney, Agent, or Firm*—Dean E. Carlson; John A. Koch

[57] ABSTRACT

A radiation detection system capable of detecting neutron and gamma events and distinguishing therebetween. The system includes a detector for a photomultiplier which utilizes a combination of two phosphor materials, the first of which is in the form of small glass beads which scintillate primarily in response to neutrons and the second of which is a plastic matrix which scintillates in response to gammas. A combination of pulse shape and pulse height discrimination techniques is utilized to provide an essentially complete separation of the neutron and gamma events.

12 Claims, 5 Drawing Figures

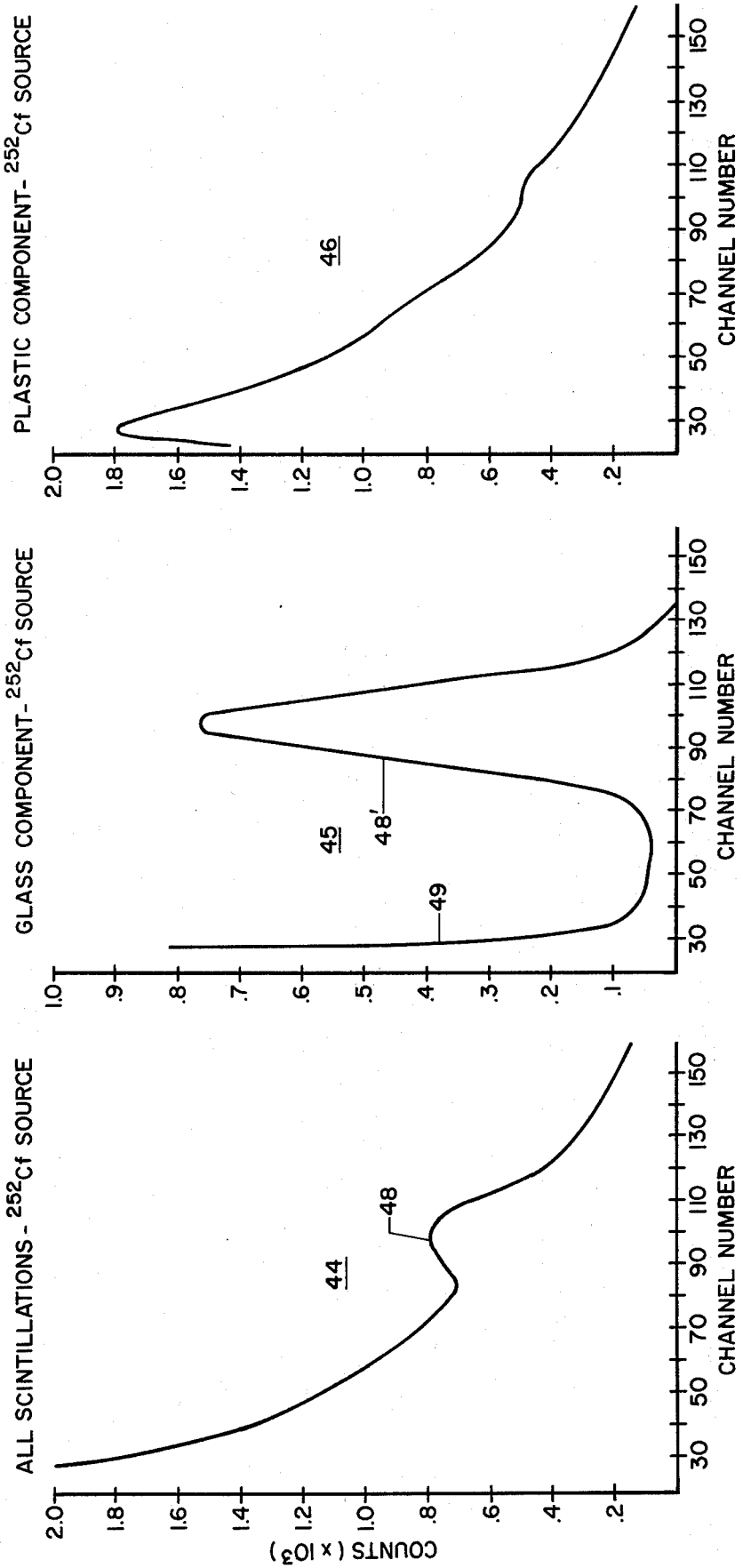

COMBINATION NEUTRON-GAMMA RAY DETECTOR

BACKGROUND OF THE INVENTION

The invention described herein was made in the course of or under Contract E(29-1)-1183 with the U.S. Energy Research and Development Administration.

This invention relates to radiation detection and more particularly to a radiation detection system which is capable of detecting gamma and neutron events and discriminating therebetween.

The detection of neutrons in the presence of an associated large flux of gamma rays has always presented a difficult problem. One approach to that problem has been to use a type of detector, such as a $BF_3$ proportional counter, which is intrinsically insensitive to gamma rays. Another approach has been to provide a high Z shielding material around a detector in order to reduce the gamma flux which is actually seen by the detector.

There are many occasions when it is necessary to detect both the neutron and gamma ray contribution from a radiation source. Heretofore this has generally been accomplished by utilizing a pair of detectors, one for detecting the neutrons and the other for gammas. However, when the radiation surveillance of a source is to be carried out from an airplane, helicopter, or the like, the space and/or weight requirements of a dual system can impose severe limitations on the surveillance mission.

Accordingly, the present invention is directed to a combination neutron-gamma ray detector which is capable of essentially complete separation between neutrons and gamma rays while maintaining a high efficiency for both. The reduction in weight and space requirements that the combination detector according to the invention provides over dual systems previously available makes it particularly advantageous for incorporation into airborne radiological survey systems. The detector, according to the invention, has a high efficiency per size and/or weight relative to other systems presently utilized for detecting neutrons in the presence of gamma rays or for detecting both neutrons and gamma rays.

SUMMARY OF THE INVENTION

It is an object of this invention to provide a radiation detection system which is highly efficient per size and weight. It is also an object of the invention to provide a radiation detection system which is capable of detecting both neutrons and gamma rays. It is a further object of the invention to provide a combination neutron-gamma ray detector which is capable of distinguishing between neutrons and gamma rays while maintaining a high efficiency for both. In addition, it is an object of the invention to provide a radiation detection system of relatively small size and modest weight which is capable of distinguishing between neutrons and gamma rays.

Briefly summarized, the above and additional objects and advantages of the invention are accomplished by a system which includes providing a detector for a photomultiplier arrangement which utilizes a combination of two phosphor materials, the first of which scintillates primarily in response to neutron radiation and the second of which scintillates primarily in response to gamma rays.

A difference in the decay time constants of the two phosphor materials is utilized to provide pulse shape discrimination between scintillations in the two phosphors. The pulse shape discrimination is used to control an output selection means, such as a coincidence gate, to separate the output of the photomultiplier into the contributions of each of the two phosphors.

The detector utilizes a combination of relatively small glass particles or beads distributed throughout a matrix of a scintillating plastic material. The size of the beads is selected so that they are large enough to provide a high absorption probability for neutrons and yet small enough (and at a sufficient distance apart) that the energy level at which scintillations corresponding to gamma events occur is characteristically much lower than those corresponding to neutron events, thereby providing pulse height discrimination. Beads of a silicate glass, activated with cerium and containing lithium enriched in $^6Li$, utilized in conjunction with a polyvinyltoluene plastic material matrix which has been enriched with scintillating materials is a particularly advantageous combination of phosphor materials for the combination detection system according to the invention.

Thermal neutrons are detected in the glass beads via the $^6Li$ $(n,\alpha)t$ reaction which has a positive Q-value of 4.79 MeV. The $\alpha$-particle and triton are emitted in opposite directions with energies of 2.05 MeV and 2.74 MeV, respectively. Since the absorption mean free path for thermal neutrons is typically on the order of 0.6 to 0.7 mm for this type of glass, very high neutron detection efficiencies can be obtained with relatively small glass particles. On the other hand, the Compton electrons arising from gamma interactions within the glass have a longer range within the glass than neutrons of the same equivalent energy. Therefore, the use of glass particles of a sufficiently small size leads to a pulse height separation between neutrons and gammas having the same equivalent energy.

Polyvinyltoluene has the ability to wet the glass beads, thereby providing good optical coupling and facilitating the manufacture of the combination detector. In addition, the index of refraction of polyvinyltoluene is very close to that of the glass, thereby facilitating transmission of light from the glass into the photomultiplier tube. Since the plastic is a solid in the temperature range within which the detector will be used, the glass beads are fixed in position and thereby given some protection from mechanical shock. Plastic can be formed into a variety of shapes depending upon the particular application and due to the high hydrogen content of polyvinyltoluene, it also serves as a moderator to thermalize the neutrons. With the addition of scintillating chemicals to the polyvinyltoluene, an efficient gamma ray detector is provided which retains spectral information on the gammas. Accordingly, the combination of pulse height and pulse shape discrimination in accordance with the invention permits an essentially complete separation of the neutron and gamma ray events.

Additional objects and advantages and a better understanding of the invention will be apparent after consideration of the following description of a preferred embodiment thereof.

BRIEF DESCRIPTION OF THE DRAWING

FIG. 3 is a graph showing the combined photomultiplier output of the glass and plastic phosphors of an apparatus according to the invention.

FIGS. 4 and 5 show the separate contributions of the glass and plastic which are combined in FIG. 3.

DESCRIPTION OF PREFERRED EMBODIMENT

Figure 1:
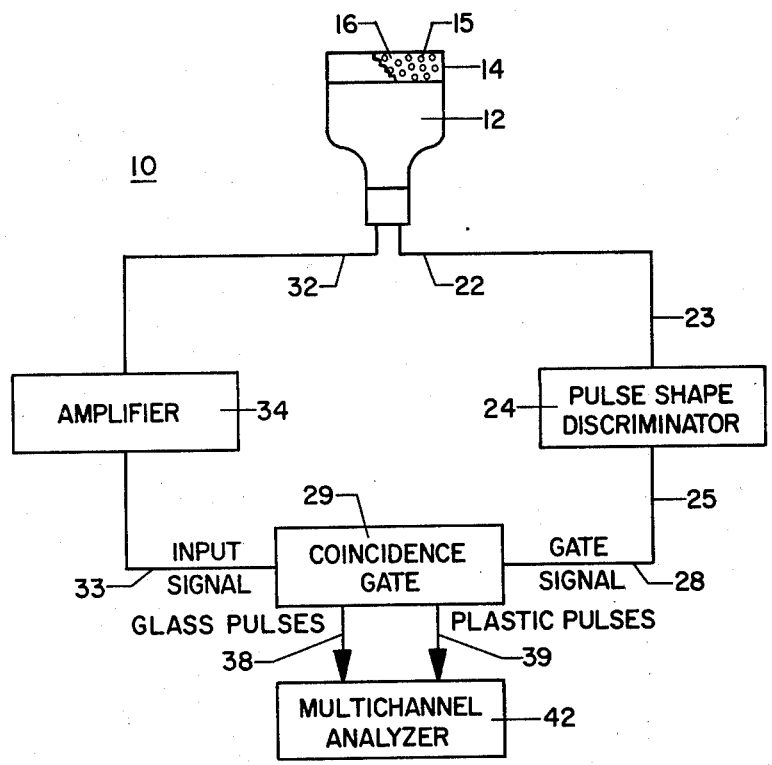
FIG. 1 is a partially schematic, partially diagrammatic representation of an apparatus for performing the invention.

It may be helpful to start this detailed description with a general overview of the system in accordance with the invention in conjunction with the components shown in FIG. 1 of the drawing. Referring to FIG. 1, a combination of electrical circuit elements 10 to practice the invention utilizes a photomultiplier 12 with a detector 14 which includes a plurality of glass particles or beads 15 in a plastic matrix 16. Glass beads 15 scintillate primarily in response to the detection of neutrons and the plastic matrix 16 scintillates in response to the detection of gamma rays as will be further discussed.

A first output 22 from photomultiplier 12 is utilized as an input 23 to pulse shape discriminator 24. Pulse shape discriminator 24 provides an output 25 which is at one switching state when output 22 of the photomultiplier is due to a scintillation in a glass bead 15 and at a second switching state when that output 22 is due to a scintillation in matrix 16. Output 25 is utilized as the gate signal 28 for coincidence gate 29.

A second output 32 of the photomultiplier is input signal 33 to gate 29, after amplification by amplifier 34 if desired (or necessary). This becomes one of two output signals 38 or 39, depending upon whether the switching state of gate signal 29 corresponds to scintillations in glass or plastic. Outputs 38 and 39 are fed into multichannel analyzer 42 to produce separate displays representative of the number of scintillations in the glass and the plastic such as the graphs of FIGS. 4 and 5, respectively, which will be further discussed.

The graphs of FIGS. 2 through 5 are representative of various outputs of a detector circuit wherein detector 14 of photomultiplier 12 was subjected to a moderated $^{252}$Cf source which emits both neutrons and gamma rays. Detector 14 inincluded particles 15 of a scintillating glass designated as NE 908 in a matrix of scintillating polyvinyltoluene designated NE 102 where NE 908 and NE 102 are compositions commercially available from Nuclear Enterprises, Inc., of San Carlos, California. The glass particles were obtained by fracturing a plate of glass and utilizing those particles which passed through a sieve having an opening size of 1 mm and were retained on a sieve having an opening size of 1/2 mm. The density ratio by weight of plastic to glass was on the order of 60:1.

Figure 2:
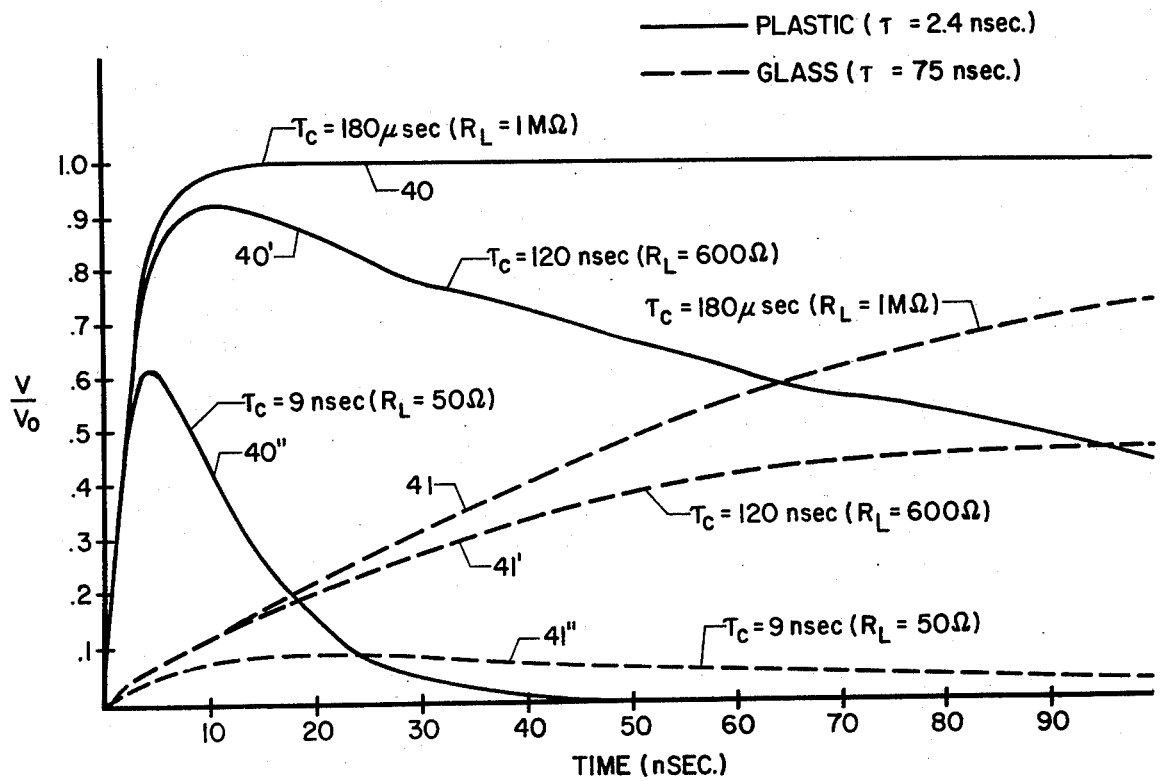
FIG. 2 is a graph showing photomultiplier pulse shapes obtained from glass and from plastic phosphors utilizing a selection of RC time constant values.

A comparison of curve 40 to 41, 40' to 41', and 40'' to 41'' of the graph of FIG. 2 will provide an understanding of the basis upon which discrimination of photomultiplier output 22 can be made to provide gate signal 28. An output voltage pulse V of a photomultiplier tube has a rise time controlled by the decay constant $\tau$ of the scintillator and a fall time determined by the RC time constant $\tau_C$ of the output circuit where R represents the load resistance and C is the capacitance including the interelectrode capacitance of the photomultiplier tube and stray capacitance. Since the decay constants for glass and plastic phosphors are typically significantly different, e.g., 75 nsec vis-a-vis 2.4 nsec, respectively, for the particular glass and plastic identified above, the output voltage pulse of the photomultiplier is of significantly different shape for the two phosphors over a range of $\tau_c$ values, other factors remaining constant. The six curves of FIG. 2 are for the pulse at the anode of a typical photomultiplier for the two phosphors at three different values of $\tau_c$ (determined by the indicated resistance values for load resistor $R_L$, C remaining constant). These curves are graphical representations of the equation:

$$\frac{V}{V_o} = \frac{\tau_c}{\tau_c - \tau}(e^{-t/\tau_c} - e^{-t/\tau})$$

where
$V_o = Q_T / C$
and
$Q_T$ is proportional to the total energy deposited in the scintillator.

As is apparent from the curves of FIG. 2, there are a number of particular approaches that could be employed in pulse shape discriminator 24 to discriminate output 22 between scintillations in the glass and in the plastic. Those approaches could use the amplitude differences, rise time differences, or other characteristics of the curves.

Curve 44 of FIG. 3 is a representation of a multichannel analyzer display of the output of photomultiplier 12 as it is applied as input signal 33 to gate 29. Curve 44 is a composite of the scintillations produced in both of the phosphors. Curves 45 of FIG. 4 and 46 of FIG. 5 are, on the other hand, multichannel analyzer displays of glass output 38 and plastic output 39 from coincidence gate 29. Pulse 48 of FIG. 4 represents the neutron-caused scintillations in the glass, also distinguishable as pulse 48' in composite curve 44, whereas partial pulse 49, terminated at the noise level, primarily represents the scintillations in the glass beads due to Compton electrons created by low-energy gammas. The pulse height discrimination accomplished by the glass beads of detector 12 is apparent in curve 45.

The optimum configuration for detector 12 would include a uniform spacing of glass beads of a size and at a distance apart that would maximize the capture of the neutrons in the glass and minimize the scintillations in the glass due to gamma-originated Compton electrons. Glass beads in a size range from about 0.25 mm to somewhat less than about 3 mm should provide usable results for particular applications. The usable loading density for any particular application would be determined by characteristics of the gamma flux involved. While glass beads of spherical shape would, in theory, be preferable, satisfactory performance has been obtained from glass beads or particles obtained by merely fracturing a glass plate of the desired chemical composition and sorting the resulting particles of random shapes by sieves to obtain the desired size range for the particular application.

Outputs 22 and 32 may be taken off from photomultiplier 12 at any convenient location. In one embodiment of the invention, output 22 was taken from the anode and output 32 from the last dynode, which was the 14th in the particular photomultiplier used. The location at which these outputs are obtained will, of course, affect the degree of amplification, if any, required by amplifier 34 or prior to pulse shape discrimination 24.

While the foregoing describes the fundamental novel features of the invention as applied to a preferred embodiment, it will be understood that various omissions, substitutions, and/or changes may be made by those skilled in the art within the principle and scope of the invention as expressed in the appended claims.

What we claim is:

1. In a system for detecting combined neutron and gamma radiation and distinguishing therebetween, the method comprising:
    a. Providing a detector for a single photomultiplier, which detector includes a first phosphor material which scintillates primarily in response to neutron radiation and a second phosphor material which scintillates primarily in response to gamma radiation,
    b. Utilizing a distinguishing characteristic of the scintillations of said first and second phosphors to produce a signal in response to scintillations of one of said phosphors and
    c. Manipulating an output selection means into which an output of the photomultiplier has been introduced as an input by said signal to produce an output from said output selection means corresponding to the scintillations of said one phosphor.

2. The method of claim 1 wherein said first phosphor material is a glass activated with cerium and containing lithium enriched in $^6$Li.

3. The method of claim 1 wherein said second phosphor material is a plastic.

4. The method of claim 3 wherein said first phosphor material is in the form of glass particles of a size large enough to provide a high absorption probability for neutrons and small enough to reduce the pulse height due to gamma interactions in the glass.

5. The method of claim 4 wherein said plastic is polyvinyltoluene activated with a scintillating material and forms a matrix for said glass particles which are in a size range between 0.25 mm and 3 mm.

6. The method of claim 1 wherein said distinguishing characteristic is the decay constant of each of the phosphors and said signal is produced in response to pulse shape discrimination of a voltage-time output of the photomultiplier.

7. The method of claim 6 wherein a second signal is produced in response to scintillations of the other of said phosphors and said output selection means is a coincidence gate, the output of which corresponds to scintillations of said one phosphor when manipulated by said one signal and corresponds to scintillations of said second phosphor when manipulated by said second signal.

8. In a system for detecting combined neutron and gamma radiation and distinguishing therebetween, the apparatus comprising:
    a. A single photomultiplier,
    b. A detector for said single photomultiplier including a first material which scintillates primarily in response to neutron radiation and a second material which scintillates primarily in response to gamma radiation,
    c. A discriminator means operatively connected to an output of said multiplier for producing a signal in response to scintillation of one of said materials and
    d. A gate means operatively connected to the output of said discriminator means and to another output of said single photomultiplier to produce an output corresponding to the scintillations of said one material.

9. The apparatus of claim 8 wherein said first material is a glass activated with cerium and containing lithium enriched in $^6$L in the form of particles in a size range from about 0.25 mm to less than about 3 mm.

10. The apparatus of claim 9 wherein said second material is a plastic material activated with scintillating materials.

11. The apparatus of claim 8 wherein said discriminator produces a second signal in response to scintillations in said second material and said gate means is a coincidence gate and produces a second output corresponding to scintillations of the other material.

12. The apparatus of claim 11 wherein said two outputs from the photomultiplier are taken from the anode and the last dynode thereof, said first material is a glass activated with cerium and containing lithium enriched in $^6$Li in the form of particles in a size range of from about 0.25 mm to less than about 3 mm dispersed within a matrix of said second material which is a polyvinyltoluene enriched with scintillating material.

* * * * *

Disclaimer 3,988,586.—*Travis P. Stuart;* and *Wilbur J. Tipton,* Las Vegas, Nev. COMBINATION NEUTRON-GAMMA RAY DETECTOR. Patent dated Oct. 26, 1976. Disclaimer filed Apr. 1, 1981, by the assignee, *The United States of America as represented by the United States Energy Research and Development Administration.*

Hereby enters this disclaimer to claims 1–12 of said patent.

[*Official Gazette June 9, 1981.*]